J. B. HELLER.
ELECTRICALLY ACTUATED PERMUTATION MECHANISM AND CIRCUITS CONTROLLED THEREBY.
APPLICATION FILED JULY 11, 1919.

1,425,963.  
Patented Aug. 15, 1922.  
7 SHEETS—SHEET 1.

WITNESS

INVENTOR.

J. B. HELLER.
ELECTRICALLY ACTUATED PERMUTATION MECHANISM AND CIRCUITS CONTROLLED THEREBY.
APPLICATION FILED JULY 11, 1919.

1,425,963.

Patented Aug. 15, 1922.

WITNESS

INVENTOR.

J. B. HELLER.
ELECTRICALLY ACTUATED PERMUTATION MECHANISM AND CIRCUITS CONTROLLED THEREBY.
APPLICATION FILED JULY 11, 1919.

1,425,963.

Patented Aug. 15, 1922.
7 SHEETS—SHEET 4.

WITNESS

INVENTOR.
Jesse B. Heller

J. B. HELLER.
ELECTRICALLY ACTUATED PERMUTATION MECHANISM AND CIRCUITS CONTROLLED THEREBY.
APPLICATION FILED JULY 11, 1919.

1,425,963.

Patented Aug. 15, 1922.

WITNESSES

Geo. E. Stebbins
H. M. Conin

INVENTOR

Jesse B. Heller
By Bakewell, Byrnes & Parmelee
his Attys

J. B. HELLER.
ELECTRICALLY ACTUATED PERMUTATION MECHANISM AND CIRCUITS CONTROLLED THEREBY.
APPLICATION FILED JULY 11, 1919.

1,425,963.

Patented Aug. 15, 1922.

J. B. HELLER.
ELECTRICALLY ACTUATED PERMUTATION MECHANISM AND CIRCUITS CONTROLLED THEREBY.
APPLICATION FILED JULY 11, 1919.

1,425,963.

Patented Aug. 15, 1922.

WITNESSES

INVENTOR

UNITED STATES PATENT OFFICE.

JESSE B. HELLER, OF WILKINSBURG, PENNSYLVANIA, ASSIGNOR TO RALPH W. BENSON, OF NEW YORK, N. Y., LOUIS WIDMEIER, OF CLEVELAND, OHIO, AND ROBERT J. BRYON.

ELECTRICALLY-ACTUATED PERMUTATION MECHANISM AND CIRCUITS CONTROLLED THEREBY.

1,425,963.  Specification of Letters Patent.  Patented Aug. 15, 1922.

Application filed July 11, 1919. Serial No. 310,055.

*To all whom it may concern:*

Be it known that I, JESSE B. HELLER, a citizen of the United States, and residing at Wilkinsburg, in the county of Allegheny and State of Pennsylvania, have invented a new and useful Improvement in Electrically-Actuated Permutation Mechanism and Circuits Controlled Thereby, of which the following is a full, clear, and exact description, reference being had to the accompanying drawings, forming part of this specification, in which—

This invention relates to an improvement in circuit control devices for automobiles or other motor driven vehicles, and is designed to provide a simple and efficient system and permutation mechanism for controlling a plurality, or all of the electric circuits used in connection with an automobile.

One of the objects of my invention is to provide an electrically actuated permutation switch for closing one or more electric circuits on motor driven vehicles, and which is so arranged that a plurality of permutation actuating circuits closed by push buttons must be closed in a prearranged sequence to close the controlling circuits, or the controlling and lighting circuits on the car.

A further object of my invention is to so arrange the mechanism and circuits of the permutation mechanism, that the main circuit for supplying current to the permutation actuating circuits is broken when the permutation mechanism is in its off position, and which can only be reestablished to actuate the permutation mechanism by pushing two predetermined buttons.

Another object of my invention is to so arrange the mechanism and the permutation circuits that I am enabled to close the circuit through the parking lights and prevent the breaking of the parking light circuit and the closing of the permutation actuating circuits by persons not knowing the combination of the permutation mechanism.

Generally speaking the device comprises a single rotary or oscillating member carrying a switch member or switch members, for closing and opening the controlling and lighting circuits, and which is arranged to be advanced and returned step by step by means of electro-magnets through which the circuits are closed by the permutation mechanism. The closing of the circuits through the electro-magnets is controlled by a plurality of push buttons which must be operated in a prearranged order to close the circuits to advance the switch or driven member step by step to close the circuits, and to open the circuits when operated out of order, with the exception of when the parking light circuit is locked.

The circuits through the electro-magnets are so arranged that they will be open when the oscillating switch member is in its fully off position and can only be reestablished by persons knowing the combination.

The precise nature of my invention will be best understood by reference to the accompanying drawings which will now be described, it being premised, however, that various changes may be made in the details of construction and general arrangement of the parts, as well as the rearranging of the circuits, without departing from the spirit and scope of my invention as defined in the appended claims.

Figure 1:
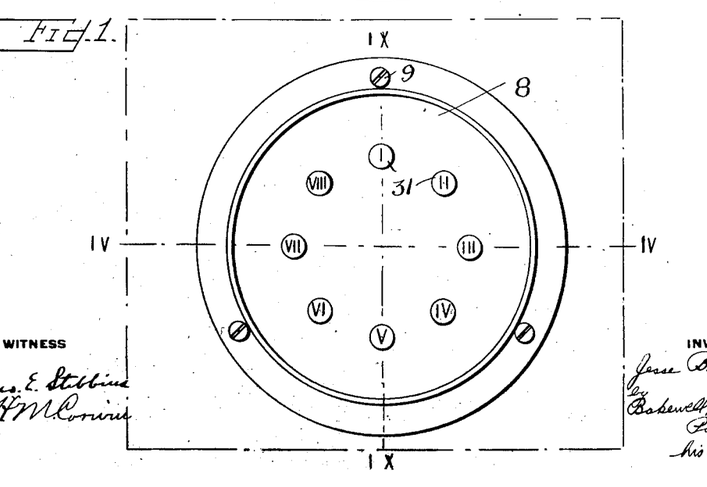
Figure 1 is a face view of the permutation mechanism applied to the dash of an automobile.

In the drawings the reference character 2 designates the shell or casing enclosing the switch mechanism, and which is provided with an annular flange 3 near the upper end thereof. 4 is an outer casing which is secured to the shell 2 by means of three screws 5 which extend through the flanges 3 on the shell 2, the dash 6 and are threaded in openings in a flange 7 on the casing 4. This casing 4 may be connected in any desired manner to the usual armor through which the electric wires from the switch mechanism pass to the various parts of the automobile. 8 is a cover for the shell 2, which is locked to the casing as hereinafter described, and is also secured in position to prevent rattling by means of three screws 9, as clearly shown in Figures 1 and 9.

Figure 2:
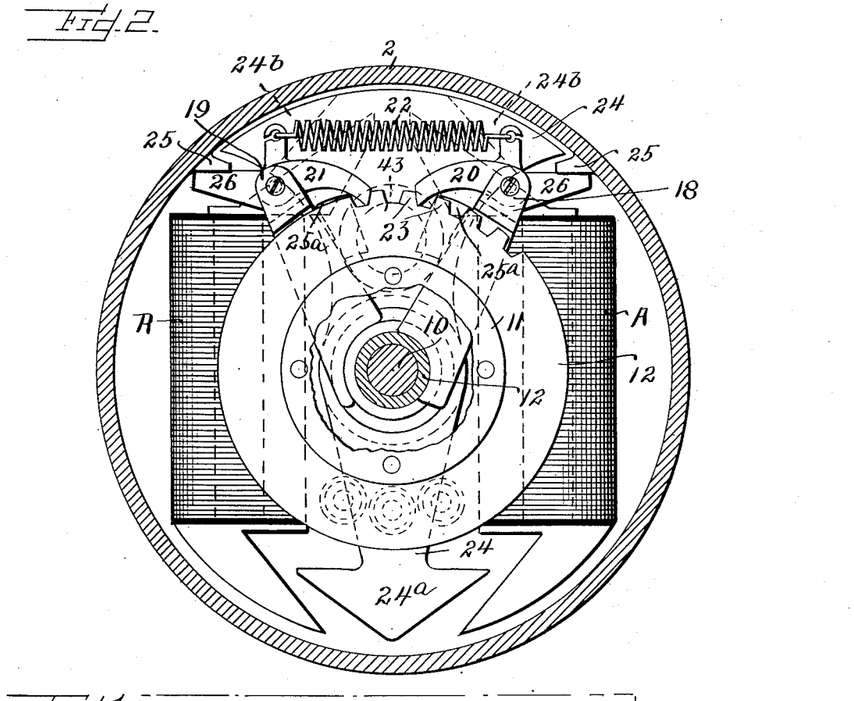
Figure 2 is a plan view on the line II—II of Figure 3.
Figure 4:
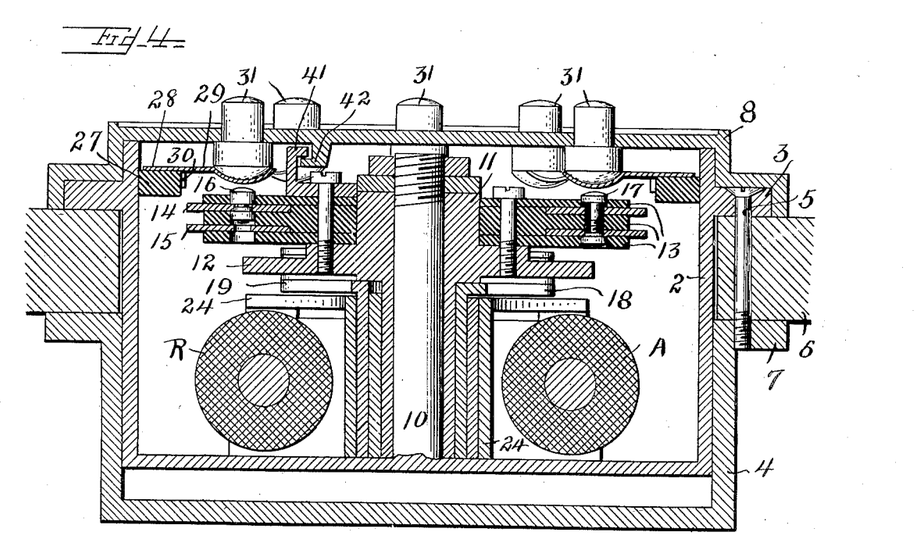
Figure 4 is a sectional view on the line IV—IV of Figure 1.
Figure 14:
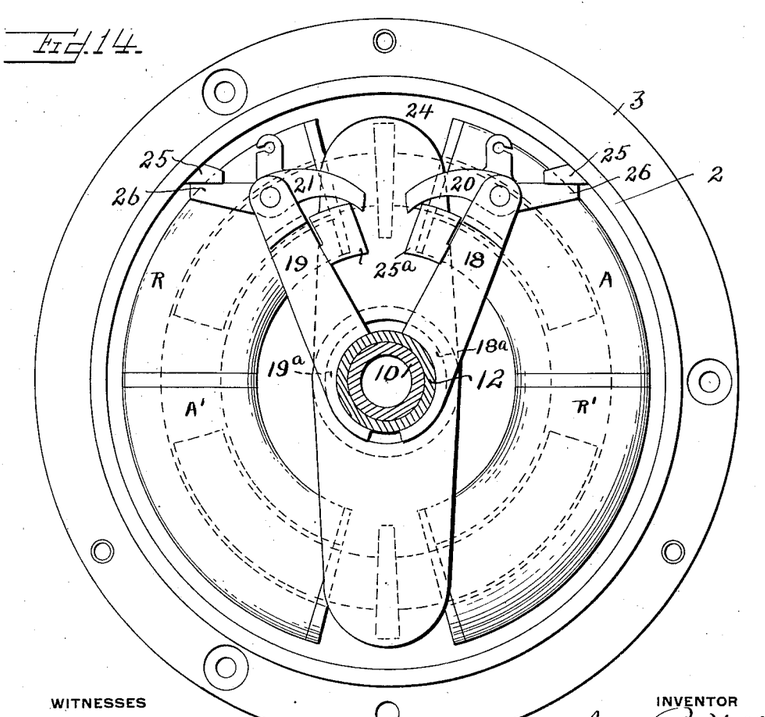
Figure 14 is a plan view of Figure 13.

Extending upwardly from the bottom of the shell 2 and formed integrally therewith is a spindle 10 which may be solid, as shown in Figures 2 and 4, or may be hollow as shown in Figure 14.

Rotatably mounted on the spindle 10 is a driven member 11 having an annular flange member 12. This driven member 11 is also provided with a plurality of insulating members 13 connected thereto, by means of screws which pass through the insulating members and the flange 12. Interposed between the insulating members 13 are annular conductors 14 and 15, each of which is provided in the construction shown, with thirty-two holes, which are in alignment with each other and in alignment with holes through the insulating members. Connected to these contact members 14 and 15 are screw contacts 16 and 17, there being twenty-eight of the contact screws 16 which are connected to the conductor 14, and four of the contact screws 17 which are connected to the conductor 15.

Figure 3:
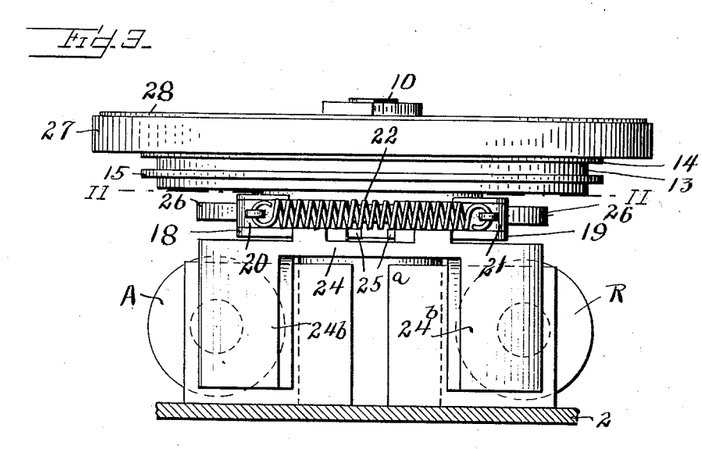
Figure 3 is a side view of the mechanism with the casing broken away.

Rotatably mounted on the boss of the driven member 11 is a pawl lever 18, and rotatably mounted on the boss of the pawl lever 18 is a second pawl lever 19. These pawl levers 18 and 19 are each provided with a forked member at the end thereof and mounted within these forked ends are pawls 20 and 21 respectively, which are connected to each other by means of a spring 22, as clearly shown in Figures 2 and 3. The pawls 20 and 21 are arranged to engage ratchet teeth 23 on the flange 12 of the driven member 11, the arrangement being such that when the driven member is moved by the pawl 20 the driven member will be advanced from the off position to close the circuits, and when actuated by the pawl 21 will be moved to its off position as hereinafter described.

Mounted within the casing at opposite sides thereof, are the magnets A and R. Each of these magnets is provided with a pole piece at both ends thereof, the pole pieces at the one end of each magnet being the reverse of the pole piece at the other end thereof.

Rotatably mounted on the boss of the pawl lever 19 is an armature 24, which is provided with a single pole piece 24$^a$ at one end and double pole pieces 24$^b$ at the other end thereof. Connected to the upper face of this armature 24 are two stops 25$^a$, which are engaged by the pawl levers 18 and 19 when the pawl levers are drawn to their neutral positions by the spring 22. The pawl levers 18 and 19 are each provided with a stop 26 which are arranged to engage a fixed stop 25 on the shell 2 when the parts are in their neutral position, as shown in Figure 2. The stops 25$^a$ on the armature 24 extend slightly beyond the periphery of the teeth 23, and are also arranged to form guards for the pawls 20 and 21, as hereinafter described.

Figure 9:
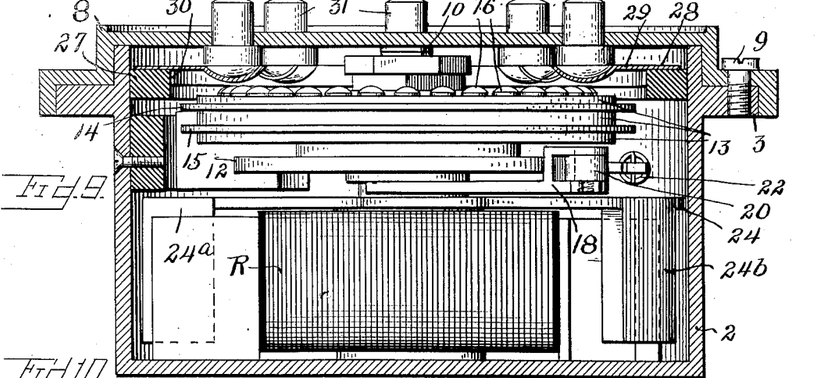
Figure 9 is a sectional view through the casing on the line IX—IX of Figure 1.

Mounted within the shell 2 and removably secured thereto, is a ring of insulation 27, and mounted on this ring 27 is a conductor ring 28 having eight radially extending members 29, and downwardly extending members 30, which members 30 assist in holding the conductor ring 28 in position on the ring 27. The outer ends of projections or fingers 29 are provided with depressions for the reception of push buttons 31, which extend upwardly through openings in the cover 8. The member 28 is formed of spring material which will also act for a conductor of electricity, the arrangement being such that when the buttons are not depressed they will be held in their elevated positions as shown in Figures 2 and 9, and when depressed the fingers 29 will be moved into contact with one of the screw contact members 16 or 17 below the button which is depressed, to close the circuit through either the conductor 14 or 15, and its respective magnet, as hereinafter described.

Figures 10, 11, 12:
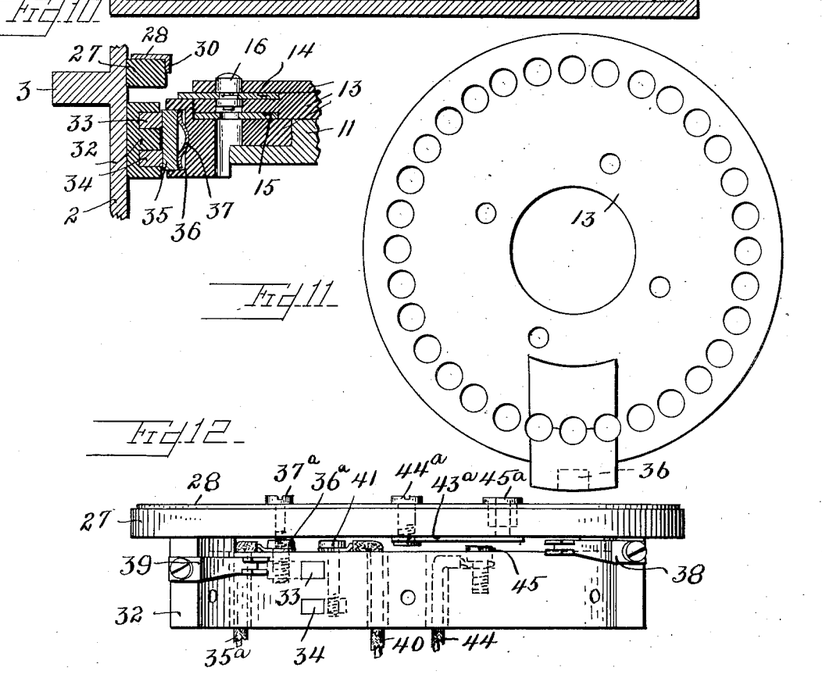
Figure 10 is a detail sectional view on the line X—X of Figure 7, with the switch in its closed position.
Figure 11 is an inverted plan view of one of the insulating members forming part of the driven member.
Figure 12 is a side elevation of the insulating supports within the casing.

Removably connected to the interior of the shell 2 and below the ring 27 is a segmental member 32 made of insulation material, and which is provided with fixed contact members 33 and 34, as clearly shown in Figures 10 and 12. 35 is a switch member mounted within a recess 36 in the lower insulating member 13 on the driven member 11, and which is held in its outward position by means of a spring 37, to close the circuit through contacts 33 and 34 when moved into alignment therewith.

The contact member 33 is connected to a wire 35$^a$ by means of a screw 36$^a$, and which wire 35ª is connected to one pole of a battery or source of energy, as hereinafter described. 37ª is a screw in electrical contact with the conductor ring 28 and the screw 36ª, so that the spring fingers 29 on the conductor ring are in direct connection with the source of energy. 38 and 39 are spring brushes connected to the insulation member 32, and which brushes are in electrical contact with annular conductors 14 and 15, respectively, on the driven member 11. The brushes 38 and 39 are connected to one side of magnets R and A, respectively, the other side of said magnets being connected to ground or to the other pole of the source of energy. The contact member 34 is connected to a wire 40 by means of a screw 41, the wire 40 is connected to one end of the primary coil of a spark coil, the other side of the primary coil being connected in the usual manner to the other side of the source of energy.

Figure 6:
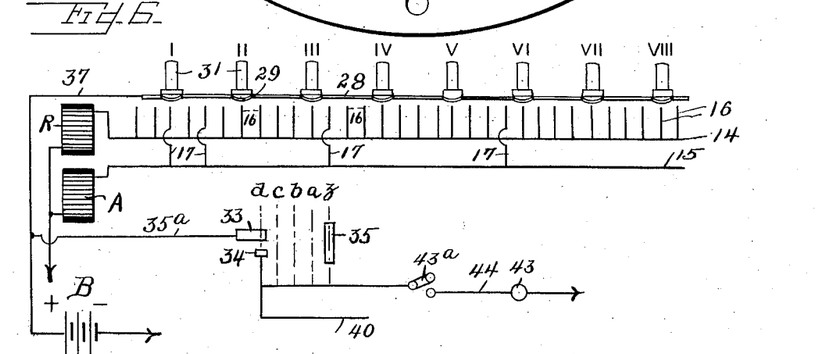
Figure 6 is an electrical diagram illustrating a simple form of the electrical connections.
Figure 7:
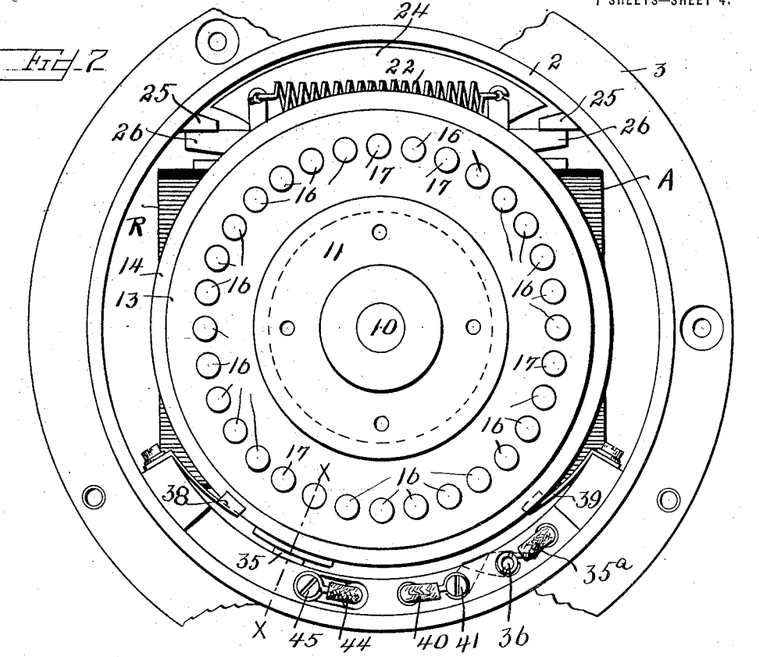
Figure 7 is a plan view similar to Figure 5 with some of the parts removed from the casing.

When the parts are in the positions shown in the majority of the drawings, the circuit to the spark coil is open. In Figure 6 I have diagrammatically illustrated the various connections, and in order to close the circuit through the spark coil the switch member 35 must be moved from the position $z$ shown in Figure 6 to position $d$.

In the drawings I have designated the various push buttons I to VIII and the particular combination for shifting the switch as shown in Figure 6 is I, III, I, V.

Figure 8:
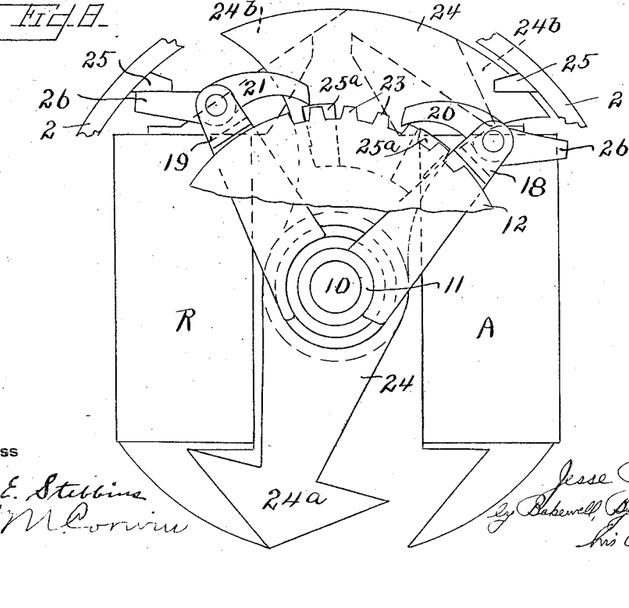
Figure 8 is a mechanical diagram illustrating the movement of the armature and one of the pawl levers.

When it is desired to close the circuit through the spark coil the button I is first pushed and the current will pass from the battery B through wire 35ª and connection 37 to conductor ring 28, and from the spring finger 29 under push button I to the contact screw 17 under push button I. This will close the circuit through the conductor member 15 and magnet A. The closing of the circuit through the magnet A will throw the armature 24 to the position shown in Figure 8. The movement of the armature from the position shown in Figure 2 to that shown in Figure 8 will retract pawl lever 18 and move its pawl 20 beyond the next tooth. Pawl lever 19, however, is estopped from movement as the stop 25 is in engagement with a stop 26. The movement of the armature 24 will also move the guard 25ª to a point where it will move pawl 21 out of engagement with the teeth 23 on the driven member. The parts will remain in this position until the push button I is released to break the circuit. When the circuit is broken the spring 22 will draw the pawl lever 18 to the position shown in Figure 2, and will rack the driven member one step. Just before the armature 24 and the lever 18 are moved to their neutral positions, the pawl 21 will pass off of the guard 25ª and engage the second tooth, so that when the parts are in their central positions the driven member 11 will be positively held against movement in either direction by pawls 20 and 21. This advancing of the driven member one step will move the switch member 35 from the position $z$ to the position $a$, and advance a screw contact 17 in connection with the conductor 15 under the push button III. The push button III is then actuated, which will move the driven member another step, and bring a screw contact 17 under he push pin I. The push pin I is again actuated, which will advance a screw 17 connected to conductor 15 under the push pin V. The push pin V is then depressed which will again shift the different parts another step to bring the switch member 35 to the position $d$ and close the circuit through the spark coil. It will readily be noted that if any of the buttons are pushed out of their proper sequence the circuit will be closed through the magnet R which will actuate the pawl lever 19 and move the driven member 11 back one step for each movement of a button out of sequence, until the driven member has been moved to its full off position. If either of the pawl levers 18 or 19 are actuated after the driven member has been moved to its full on or full off position, the driven member will remain in said position, as the pawls will ride idly over the periphery of the disk 12. If desired, however, I may provide stops to limit the movement of the driven member in either direction beyond a predetermined point.

Figure 5:
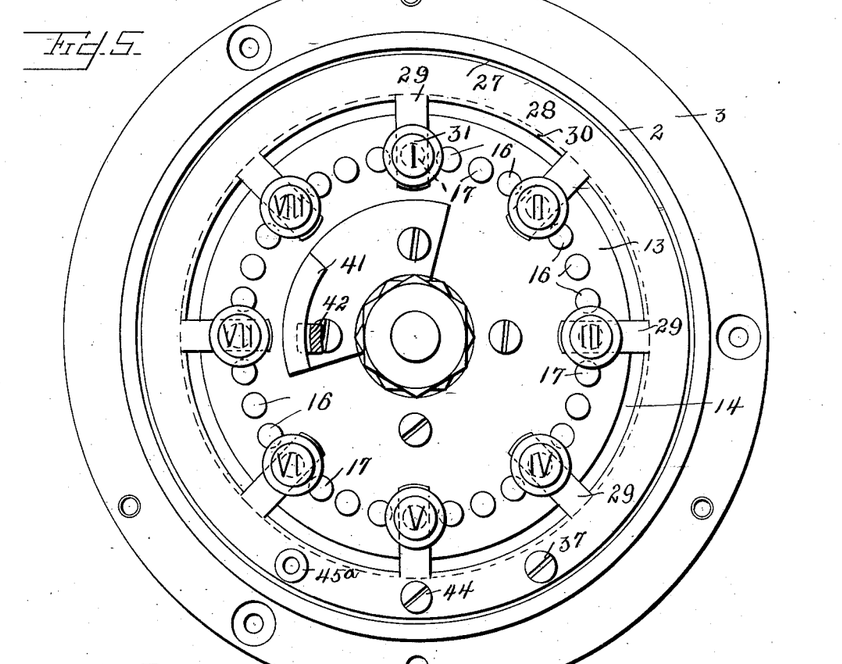
Figure 5 is a plan view of the mechanism with the cover removed.

In order to provide means for readily locking and freeing the covering 8, I connect a segmental flange 41 to the driven member as clearly shown in Figures 4 and 5, and which is arranged to engage a hook member 42 on the cover, to retain the cover in its locked position as long as the switch member 35 is in any position from $z$ to position $c$, but when the switch member is moved to the position $d$ or the unlocked position, the flange member 41 will pass beyond the hook member 42 so that the cover can readily be removed.

By this means I am enabled to readily apply and remove the mechanism from the dash of an automobile without riveting the same in position and at the same time preventing unauthorized persons from removing the cover or removing the lock or switch member from the automobile, as will readily be appreciated that in order to unlock the cover it will be necessary to know the combination.

It will also be readily appreciated that the combination of any lock can readily be changed by interchanging the screw contacts 16 and 17.

In order to provide means for readily testing the switch member, I mount an electric bulb 43 in the base of the shell 2 as indicated in dotted lines in Figure 2. One side of this bulb is connected to the ground or the negative pole of the source of energy, while the other side thereof is connected by means of a wire 44 to a screw contact 45 mounted on the member 32. Connected to the insulation ring 27 is a switch blade 43$^a$ which is electrically connected thereto by means of a screw 44$^a$. Extending through the member 28 is a bushing 45$^a$ of insulating material, and if it is desired to test the circuit from the battery through the switch, the switch member 35 is moved to position $d$, and the cover removed, and the switch blade 43$^a$ is then depressed into contact with the screw 45 by passing a match stick or other small article through the bushing 45$^a$, and if the circuit is complete from the battery to the switch and back through the lamp, the lamp will be lighted. By this means I am able to readily test the circuit through the switch member to ascertain if the switch or controller is clear of trouble.

Figure 13:
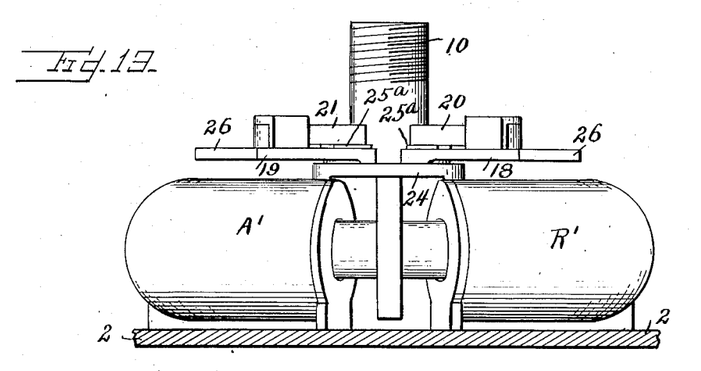
Figure 13 is a side view of a modified form of electro-magnets and armature for actuating the pawl levers.

In Figures 13 and 14 I have shown a modified form of electrical actuating devices for the driven member, and in which the pawl levers 18 and 19 are only provided with segmental bearing members 18$^a$ and 19$^a$ seated between the boss on the armature 24 and the boss on the driven member 12. In this case the spindle 10 formed integrally with the shell 2, is hollow and may be used for the stem of an auxiliary switch for closing and opening the circuit to the permutation switch, and which switch may be located within the casing 4 below the shell 2. The switch actuating stem may be provided with a button on the exterior of the cover 8 or may be provided with tumblers within the stem 10 arranged to be actuated by a suitable key. By this means I am enabled to cut off the circuit to the switch and prevent unauthorized persons from using up the energy of the battery by actuating the push buttons. In this construction the armature is actuated by solenoids R, R' connected to each other and solenoids A, A' connected to each other.

I prefer, however, to use the permutation mechanism to completely cut off the circuit to the switch mechanism when the car is locked.

Figures 15, 16:
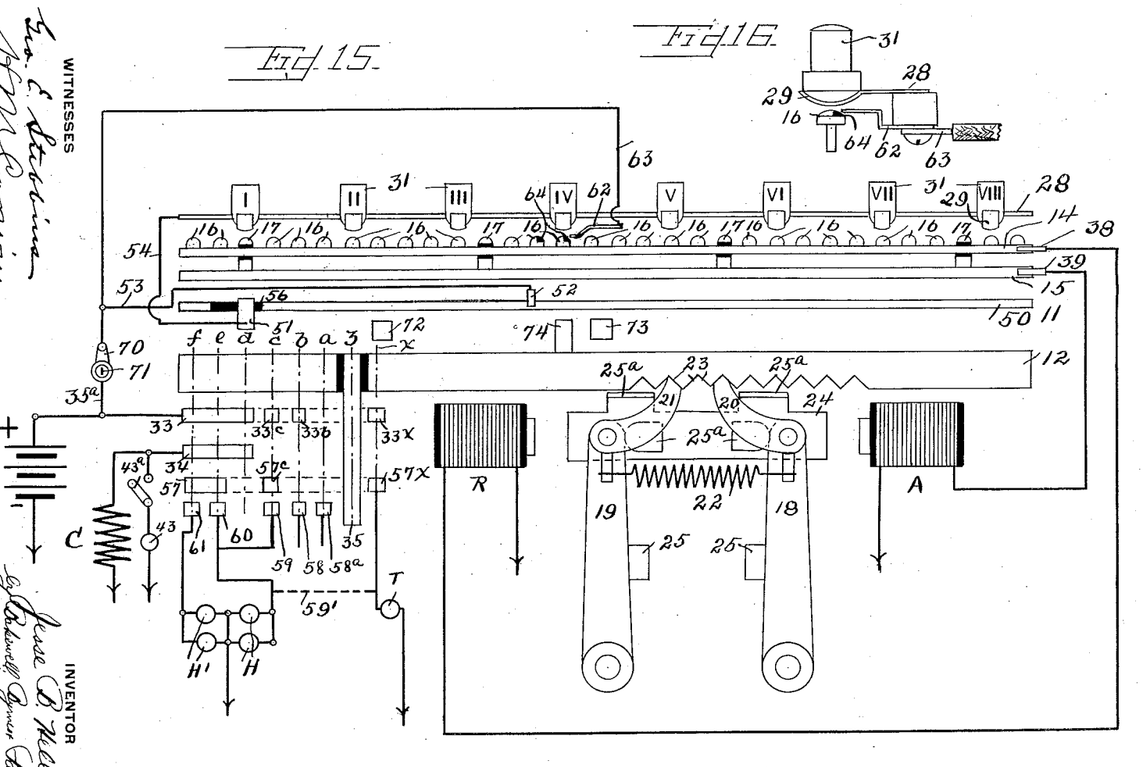
Figure 15 is an electrical diagram showing the device as connected for controlling a plurality of circuits.
Figure 16 is a detail view of the starting switch member and one of the permutation contact members.

In Figure 15 I have shown one form of carrying out this portion of my invention, and in which I have shown means for controlling at least the majority of the controlling circuits on the automobile, and in which I have used the same reference characters for designating similar parts.

In this construction I also use a stationary conductor member 28 having spring contact fingers 29, the annular conductor members 14 and 15, to which are connected the screw contact members 16 and 17, respectively, as well as an annular conductor member 50. The conductor members 14, 15, 50 and disk member 12, are connected to each other and form the driven member 11. In this construction the stationary conductor member 28 is not connected directly to the positive pole of the source of energy, but is connected thereto through the medium of the conductor member 50, brushes 51 and 52. The brush 52 is connected to the source of energy by means of a wire 53, while the brush 51 is connected to the conductor 28 by a wire 54. The conductor member 50 is provided with insulation 56 which is engaged by the brush 51 when the parts are in their off position, or the position $z$ indicated in the drawing. In this figure I have indicated positions $x$—$a$ to $f$, which are covered by the switch member 35. In this drawing the battery is connected to the contact 33, which contact is also in electrical connection with contacts 33$^c$, 33$^b$ and 33$^x$, contact member 34 which is connected to the spark coil C is considerably longer than the one shown in the other figures of the drawing, and extends over positions $d$, $e$ and $f$. 57 is another contact which extends over positions $e$ and $f$, and which is in electrical connection with contacts 57$^c$ and 57$^x$, the latter of which is connected to the tail light T. 58 and 58$^a$ are contacts in positions $a$ and $b$, respectively, and which may be connected to suitable switch controlling devices, or locking devices for the starting motor, or a magneto. 60 and 61 are contacts in positions $e$ and $f$ which are connected to head lights H and H', respectively. The head lights H may be dim while the lights H' may be bright.

59 is a contact in position $c$ which is connected to the head light circuit H, and 59' is a wire shown in dotted lines for connecting the tail light circuits T with the dim head light circuit H.

70 is an auxiliary switch in the main line from the battery to the switch controlling mechanism, and which is arranged to be shifted by the stem 71, which may extend up through the hollow stem 10 in a construction such as shown in Figure 14, and which may be actuated by a button on the exterior of the casing or by means of a key.

Connected to any stationary portion of the mechanism are two stops 72 and 73, and connected to the member 11 is a movable stop 74, which is arranged to engage the stop 72 when advanced to its full limit (position $f$) and to engage the stop 73 when moved backward to its full limit (position $x$), or one point beyond the off position.

Connected to any fixed portion of the casing is a spring contact member 62 which is connected to the positive pole of the battery B by means of a wire 63, and which contact finger in this case is directly under push button IV. The screw contact member 16 below the push button IV and one step to the left thereof, are provided with insulation 64 at one side thereof which is immediately under the end of the spring finger 62.

The various parts are shown in the off position, and as shown the circuit is broken by the insulation 56, and when in this position it is impossible to close the circuit through any portion of the switch when any one of the push buttons I to VIII are moved. When it is desired to close the controlling circuits on the automobile it is necessary to push the button IV, together with the first button of the combination, which in this case is I (the full combination being I, III, V, VII, VIII, II). By pushing the button IV the circuit is closed from the battery to the conductor member 28 and in order to advance the driven member 11 it is necessary to push the first button (I) of the combination to advance the driven member by retracting the pawl lever 18 through the medium of the magnet A. If the button IV, together with any other button, is pushed, the driven member will be moved from the position $z$ to the position $x$, the purpose of which will be later on described.

When the buttons I and IV are pushed, the switch member will be advanced from position $z$ to position $a$. This will move the conductor members 14, 15 and 50 and shift the metallic portion of conductor 50 under the brush 51, so that the conductor member 28 will then be in electrical connection with the positive pole of the battery through the medium of wire 53, brush 52, brush 51, and wire 54, so that in order to advance the brush 35 from position $a$ to positions $b$, $c$, $d$, $e$, $f$, it is only necessary to push the proper buttons of the combination. When the brush 35 is moved to position $b$ over contact 58, the circuit will be closed for unlocking the starting motor, and when the brush 35 is moved to position $d$ the circuit through the spark coil will be closed, and at which time the various circuits for operating the car will be in the closed position. If it is desired to turn on the dim head lights and the tail light, it is only necessary to push the next button of the series (button VIII) in order to advance the switch 35 to position $e$, as the pin 17 shown under the button I in the drawing would now be under button VIII. This is done without disconnecting the circuit to the spark coil, and when the switch member 35 is' in this position the circuit will also be closed through the tail light. If it is desired to turn on the bright head lights, it is only necessary to push the button II which will advance the mechanism to bring the brush 35 to the position $f$ and when at this position the circuit will be closed through the spark coil, the tail light and the bright head lights, and when it is desired to cut out the bright head lights and turn on the dim head lights, it is only necessary to push a button other than button II, which will return the mechanism one step to bring the switch member 35 to position $e$. If it is desired to coast at night, any button can be pushed twice in succession with the exception of buttons VII or VIII, which will move the switch member 35 to position $c$, so that the current will be broken to the spark coil but will be maintained through the tail light and the dim head lights.

When it is desired to park the car at night, the switch member is first moved back to the off position $z$ by pushing any of the buttons except in combination order, and after it has reached this position it is necessary to push button IV, together with any other button except button I to shift the switch member 35 over the position $x$ and when in this position the circuit will be closed through the tail light and the dim head lights if a wire such as 59' is used for connecting the two circuits and the current cannot be reestablished through the conductor 28 without pushing button IV and button VIII which is now the first button of the combination. By this means I am enabled to turn on the parking lights at night and prevent unauthoribed persons from actuating the controller to turn off the lights unless the combination is known to them.

The advantages of my invention result from the provision of a controller for a plurality of normally open circuits, together with permutation mechanism for actuating the controller to move it step by step in either direction when the permutation mechanism is operated in a prearranged sequence, in order to successively open, close or maintain closed, the different circuits controlled thereby.

A further advantage of my invention results from the provision of an improved controller for electric circuits for motor driven vehicles, which is arranged to be actuated step by step in either direction by electromagnetic means controlled by permutation mechanism to move the controller step by step in either direction when the permutation mechanism is actuated in a prearranged sequence, together with electrically controlled devices for actuating the permutation mechanism.

Another advantage of my invention results from the provision of means for opening the permutation circuits for actuating the controller when the controller is moved to its off position, and which is so arranged that the circuits to the permutation mechanism can only be reestablished by the closing of two permutation circuits.

Further from the provision of means for closing the park light circuit by means of the controller, and at the same time breaking the circuit to the permutation mechanism, so that the park lights cannot be disconnected unless the circuit to the permutation mechanism is reestablished by the closing of two prearranged circuits.

A further advantage results from the provision of a controller for the circuits of automobiles, whereby the controller is actuated in a step by step manner by electric means, together with electric means for testing the switch when the switch has been moved to its closed position, in order to locate trouble, or to ascertain if the switch mechanism is clear of trouble.

A still further advantage results from the provision of means for connecting the switch or controller to the dash of an automobile, whereby the device can readily be attached and detached without riveting, and at the same time lock the connecting means against persons not knowing the combination, and which at the same time is so arranged that persons familiar with the combination can readily expose the mechanism to view and at the same time expose the securing members.

I claim:

1. A device of the character described, comprising a driven member, a switch member, contact members, the switch member and contact members being carried by the driven member in order that the switch and contacts are moved relative to each other, said contacts being connected to circuits to be controlled, and electro-magnetically controlled permutation mechanism for moving said driven member step by step in either direction to close and open the circuits in a pre-arranged order, substantially as described.

2. A device of the character described, comprising a driven member, a plurality of fixed contacts connected to a circuit to be controlled, a switch member carried by the driven member for closing and opening the circuit, and electro-magnetically controlled permutation mechanism for moving said driven member step-by-step in either direction, substantially as described.

3. A device of the character described, comprising a driven member, a plurality of contacts connected to the circuits to be controlled, a switch member carried by the driven member for closing and opening said circuits in a pre-arranged order, and electro-magnetically controlled permutation mechanism for moving said driven member step-by-step in either direction; substantially as described.

4. A device of the character described, comprising a driven member, a plurality of sets of fixed contacts connected to motor control and light control circuits, a switch member carried by the driven member for closing and opening said circuits in a pre-arranged order, and electro-magnetically controlled permutation mechanism for moving said driven member step-by-step in either direction when actuated in a prearranged order, substantially as described.

5. Permutation mechanism comprising a driven member, a plurality of pawls, for actuating the driven member in two directions, an electro-magnet for actuating each pawl for moving the driven member step-by-step, a plurality of switches for closing the circuits through said magnets, and means for actuating said switches in a prearranged order to close the circuit through one of the magnets to actuate the driven member step-by-step in one direction, said means also being arranged to return the driven member step-by-step by closing the circuit through the other magnet when actuated out of order, substantially as described.

6. A circuit controlling switch, comprising a driven member having a movable switch member thereon, a ratchet wheel on said driven member, a pawl arranged to move the driven member in one direction, an electro-magnet for actuating said pawl, a second pawl for moving the driven member in the reverse direction and an electro-magnet for actuating said pawl, a plurality of fixed contacts connected to a source of energy, a plurality of movable contacts carried by the driven member, some of said movable contacts being arranged to close the circuit through one of said magnets, while the others are arranged to close the circuit through the other magnet, the arrangement being such that the driven member will be moved step-by-step from off position when the fixed contacts are moved into engagement with the movable contacts in a prearranged order, and to return the driven member to the off position when actuated out of order, substantially as described.

7. Permutation mechanism comprising a driven member, step-by-step mechanism for moving the driven member in one direction, an electro-magnet for actuating said step-by-step mechanism, a second step-by-step mechanism for moving the driven member in the reverse direction, an electro-magnet for actuating said second step-by-step mechanism, a plurality of fixed contacts connected to a source of energy, a plurality of movable contacts carried by the driven member and in electrical connection with one of said magnets, and a second set of movable contacts connected to the driven member in electrical connection with the other magnet, the arrangement being such that the driven member will be moved step-by-step in one direction when the fixed contacts are moved into engagement with the movable contacts in a prearranged order, and to move the driven member in the reverse direction when any of said fixed contacts are moved into contact with the movable contacts out of order, substantially as described.

8. Permutation mechanism comprising a driven member having a ratchet wheel, two pawl levers, a pawl connected to each of said levers, an armature arranged to actuate the pawl levers, an electro-magnet for moving the armature in one direction, a second magnet for moving the armature in the other direction, means on the pawl levers and armature for shifting the pawl levers, together with their pawls when the armature is shifted by the electro-magnets, a plurality of movable contacts carried by the driven member in electrical connection with one of the magnets, a second set of movable contacts carried by the driven member in electrical connection with the other magnet, and a plurality of relatively fixed contacts arranged to be moved into electrical connection with the movable contacts to advance the driven member step-by-step when the fixed contacts are actuated in a prearranged order, substantially as described.

9. Permutation mechanism comprising a driven member, a ratchet wheel on said driven member, a pawl lever having a pawl thereon for advancing the ratchet together with the driven member, a second pawl lever having a pawl thereon for returning the ratchet wheel together with the driven member, an oscillating armature, two electro-magnets for actuating said armature in reverse directions, connections between said armature and the pawl levers for actuating one of the pawl levers when the armature is moved in one direction and for actuating the other pawl lever when the armature is actuated in the reverse direction, a spring for moving said pawl levers toward each other, fixed stops for limiting the movement of the pawl levers in one direction, guards on the armature arranged to move one of the pawls out of engagement with the ratchet wheel when the other pawl is moved by the armature, and permutation mechanism for closing the circuits through the two magnets arranged to advance the driven member step-by-step when actuated in a prearranged order, substantially as described.

10. Permutation mechanism, comprising a driven member, a ratchet wheel on said driven member, a paw lever having a pawl thereon for advancing the ratchet together with the driven member, a second pawl lever having a pawl thereon for returning the ratchet wheel together with the driven member, an oscillating armature, two electro-magnets for actuating said armature in reverse directions, connections between said armature and the pawl levers for actuating one of the pawl levers when the armature is moved in one direction and for actuating the other pawl lever when the armature is actuated in the reverse direction, a spring for moving said pawl levers towards each other, fixed stops for limiting the movement of the pawl levers in one direction, guards on the armature arranged to move one of the pawls out of engagement with the ratchet wheel when the other pawl is moved by the armature, and permutation mechanism for closing the circuits through the two magnets arranged to advance the driven member step-by-step when actuated in a prearranged order, and to return the driven member step-by-step when actuated out of order, substantially as described.

11. A switch having a movable switch member, a contact arranged to be engaged by said switch member to close the circuit, mechanism for shifting said switch member step-by-step to open or close said circuit, electro-magnetic means for actuating said mechanism, and a plurality of permutation switches for closing the circuits for advancing the movable switch member step-by-step when operated in a prearranged sequence, substantially as described.

12. Permutation mechanism having a driven member, electro-magnetic means for moving the driven member step-by-step within predetermined limits, and a plurality of switches for controlling the circuits to the electro-magnetic means for advancing the driven member step-by-step when actuated in a prearranged order, substantially as described.

13. Permutation mechanism having a driven member, electro-magnetic means for moving the driven member step by step in either direction within predetermined limits, and a plurality of switches for controlling the circuits to the electro-magnetic means for advancing the driven member step-by-step from its fully off to its fully on position when actuated in a prearranged order and to move it step-by-step towards its off position when actuated out of order, substantially as described.

14. A switch having a switch member and a plurality of contact members, said switch member and contact members being arranged to be moved relative to each other, electrically actuated permutation mechanism for advancing one of said switch members step-by-step when said permutation mechanism is actuated in a prearranged order, and a motor control circuit connected to some of said contacts arranged to be opened and closed by the switch member, substantially as described.

15. A switch having a switch member and a plurality of contact members, said switch members and contact members being arranged to be moved relative to each other, electrically actuated permutation mechanism for advancing one of said members step-by-step when said permutation mechanism is actuated in a prearranged order, and a plurality of motor control circuits connected to some of said contacts arranged to be opened and closed in a prearranged sequence by the switch member, substantially as described.

16. A switch having a switch member and a plurality of contact members, said switch member and contact members being arranged to be moved relative to each other, electrically actuated permutation mechanism for advancing one of said members step-by-step when said permutation mechanism is actuated in a prearranged order, a motor control circuit connected to some of said contacts and arranged to be opened and closed by the switch member, and a light circuit arranged to be opened and closed by the switch member, substantially as described.

17. A switch having a switch member and a plurality of contact members, said switch member and contact members being arranged to be moved relative to each other, electrically actuated permutation mechanism for advancing one of said members step-by-step when said permutation mechanism is actuated in a prearranged order, a motor control circuit connected to some of said contacts, arranged to be opened and closed by the switch member, and a plurality of light circuits arranged to be opened and closed by the switch member, substantially as described.

18. A device of the character described, comprising a driven member, electro-magnetic permutation mechanism for moving the driven member step-by-step, a plurality of contacts, a source of energy connected to one of said contacts, a motor control device connected to one of said contacts, a motor control device connected to another contact and arranged to be actuated when the circuit is closed through said contacts, and a switch member connected to the driven member arranged to close the circuit through the motor control device when the switch member engages said contents, substantially as described.

19. A switch for opening and closing a motor control circuit, permutation mechanism for moving said switch, and other means for testing the circuit when the switch has been moved to its closed position, substantially as described.

20. A switch mechanism comprising a casing, a cover for said casing, permutation mechanism comprising a driven member and a plurality of actuating members associated therewith for moving the driven member step-by-step, said actuating devices having members extending through the cover, and locking means associated with the driven member and the cover for securing the cover in position when the driven member is moved from its closed position, substantially as described.

21. A controller for a plurality of normally open electric distributing circuits, comprising a movable member, permutation means for moving said member to successive positions, and means carried by said member for successively closing said circuits upon movement thereof to successive positions, substantially as described.

22. A controller for a plurality of normally open electric distributing circuits, comprising a movable member, electrically actuated permutation members for successively moving said member to successive positions, and means carried by said member for successively closing said circuits upon movement thereof to successive positions, substantially as described.

23. A controller for a plurality of electric distributing circuits adapted to be opened and closed to vary the number of circuits closed comprising a member movable in opposite directions to successively open certain of said circuits, and close other of said circuits, means for moving said member to successive positions in either directions, and means carried by said member for varying the number of closed circuits upon movement thereof, substantially as described.

24. A controller for a plurality of normally open electric distributing circuits, comprising a movable member, electro-magnetic means for moving said member step-by-step to successive positions, permutation mechanism for controlling the electro-magnetic means, and means carried by said member for closing said circuit upon movement thereof to successive positions, substantially as described.

25. A controller for a plurality of normally open electric distributing circuits, comprising a movable member, electro-magnetic means for moving said member step-by-step to successive positions, and permutation mechanism for controlling the electro-magnetic means to shift the movable member to successive positions, substantially as described.

26. A controller for a plurality of normally open electric distributing circuits, comprising a movable member, electro-magnetic means for moving said member step-by-step to successive positions, and permutation mechanism for controlling the electro magnetic means to shift the movable member to successive positions in either direction, substantially as described.

27. A controller for a plurality of normally open electric distributing circuits, comprising a movable member, electro-magnetic means for moving said member step-by-step to successive positions, permutation means including permutation circuits for controlling the electro-magnetic means to shift the movable member step-by-step to successive positions, means for breaking the electrical connections to the permutation circuit when the driven member is in a predetermined position to prevent movement thereof by the normal operation of the permutation mechanism, and means for moving the driven member one step by the electro-magnetic means by an abnormal operation of the permutation mechanism, to re-establish the electrical connections to the permutation circuit, substantially as described.

28. A controller for the motor control circuits and lamp circuits of an automobile, comprising a movable member, electro-magnetic means for moving said member step-by-step to successive positions, permutation mechanism for controlling the electro-magnetic means to shift the movable member to successive positions, a switch member connected to the movable member, a plurality of contacts arranged to be engaged by the switch member, a source of energy connected to one of the contact members, a connection leading from another contact member to the spark coil, a plurality of contacts connected to a parking light system, the arrangement being such that when the switch member is in one position, the circuit will be closed to the spark coil as well as the parking light circuit, substantially as described.

In testimony whereof, I have hereunto set my hand.

JESSE B. HELLER.